Figure 1:
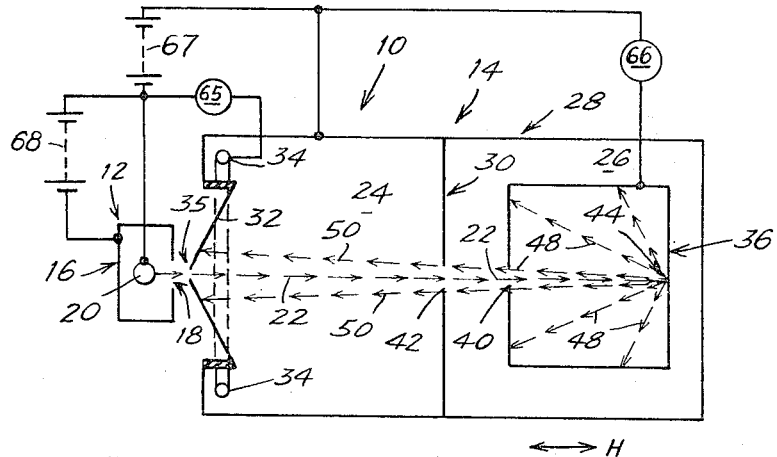

Dec. 13, 1966  R. F. HERZOG  3,292,078
VACUUM GAUGE HAVING AN X-RAY TRAP AND A SHIELD
Filed Dec. 8, 1961

INVENTOR
Richard F. Herzog,
BY Diggins + LeBlanc
ATTORNEYS

United States Patent Office 3,292,078
Patented Dec. 13, 1966

3,292,078
VACUUM GAUGE HAVING AN X-RAY TRAP AND A SHIELD
Richard F. Herzog, Lexington, Mass., assignor to GCA Corporation, Bedford, Mass., a corporation of Delaware
Filed Dec. 8, 1961, Ser. No. 158,044
5 Claims. (Cl. 324—33)

This invention relates to an ion vacuum gauge and more particularly to an ion vacuum gauge having a structure configuration which substantially eliminates the undesired electrical current produced in a measuring circuit by X-rays.

It is common practice in the operation of ion vacuum gauges to bombard the gas molecules within the gauge with a stream of electrons thereby producing ions which are then measured by the electrical signal they produce in a collector circuit. It has been found, however, that as the electrons are accelerated to ion producing velocity, a portion of the electrons will often strike some surface within the ion gauge. This striking of the surfaces of the gauge by high energy electrons will produce bursts of X-rays. These X-rays travel straight in all directions and, should they strike other surfaces, especially the ion collector, will produce photo electrons. These photo electrons will be attracted away from the ion collector element and will produce a current in the collector readout circuit that is the same direction as the current produced by the ions.

From the above it can be seen that these photo electrons produced by X-rays will give the same type reading as do the ions which are to be recorded. Thus, with no ions present in the gauge there will be a certain minimum current produced by this photo electron flow which will appear in the ion readout circuit. This minimum current will determine the measuring capacity of the ion gauge since the minimum ion current measurable would have to be greater than the current produced by the photo electrons in order to be detected. From this it can be seen that, in order to record extremely low pressures using an ion gauge, the presence of any X-rays within the gauge must be eliminated.

Heretofore, two different approaches have been taken to the problem of reducing the amount of X-rays generated within and detected by an ion gauge. The first of these approaches has been to operate the cathode at a very low temperature. With the electron current between the cathode and anode greatly reduced, due to the low cathode temperature, the amount of X-rays produced by electrons striking the various gauge elements is also greatly decreased.

Although the above procedure will reduce the X-ray emission to some extent, it is undesirable because such a system requires critical adjustments of several electronic control circuits. The operation of the gauge at this low cathode temperature is also undesirable since it materially decreases the overall sensitivity of the gauge.

The second approach to the reduction of the X-ray emission problem has been to use a tube structure that resembles somewhat the typical orthicon tube. This type ion gauge comprises a filament, control grid, and a tubular anode structure arranged in much the same manner as the simple triode tube. The electrons emitted from the filament are accelerated through the grid, which is operated at a positive potential, and oscillate about this grid ionizing any gas molecules which may be present within the tube structure. The oscillation of these electrons through the grid will inevitably result in the grid being bombarded to a greater extent by electrons than is normally the case. This bombardment produces X-rays in large quantities.

The plate of the gauge is usually connected to an ion detecting circuit which may be, for example, a meter. The plate is normally operated at a negative potential in relationship to the grid and filament, thereby attracting any positive ions that may be generated by the electron beam.

In order to minimize the photo electron current produced by the X-rays emitted from the grid, it has been proposed that the ion collector of this type gauge be made extremely small. To decrease the size of the ion collector sufficiently to reduce the amount of X-rays produced by any appreciable amount would, however, result in a mechanically weaker gauge structure. Even with the ion collector reduced to its maximum amount, the ultimate pressure at which such a gauge will give an accurate reading above background noise is no lower than $10^{-10}$ millimeters of mercury. This limitation of the range is due nearly exclusively to the relatively large amount of X-rays and subsequent photo electrons being produced by the electron beams striking the grid structures.

According to the present invention, it has been found that the amount of X-ray and subsequent photo electron emissions occurring within an ion gauge can be reduced substantially by proper gauge construction. The basic approach taken by this application in preventing the photo electron emission is to arrange the collector electrode of the ion gauge in such a manner as to shield it from any X-rays that may be produced. This shielding of the collector is fairly easily accomplished due to the fact that the X-rays produced are of a soft type and cannot penetrate even a thin metal shield. By the use of this shielding approach, it has been found that the amount of photo electrons being produced on the ion collector is substantially reduced. This reduction results in an ion gauge which is capable of measuring pressure far lower than $10^{-10}$ millimeters of mercury.

A primary object of this invention is to provide an improved ion gauge capable of measuring extremely low pressures.

Another object of this invention is to provide an ion gauge which, due to its geometric construction, will substantially reduce the X-rays striking the collector element.

Yet another object of this invention is to provide an ion gauge having greater mechanical strength than prior known devices.

Figure 2:
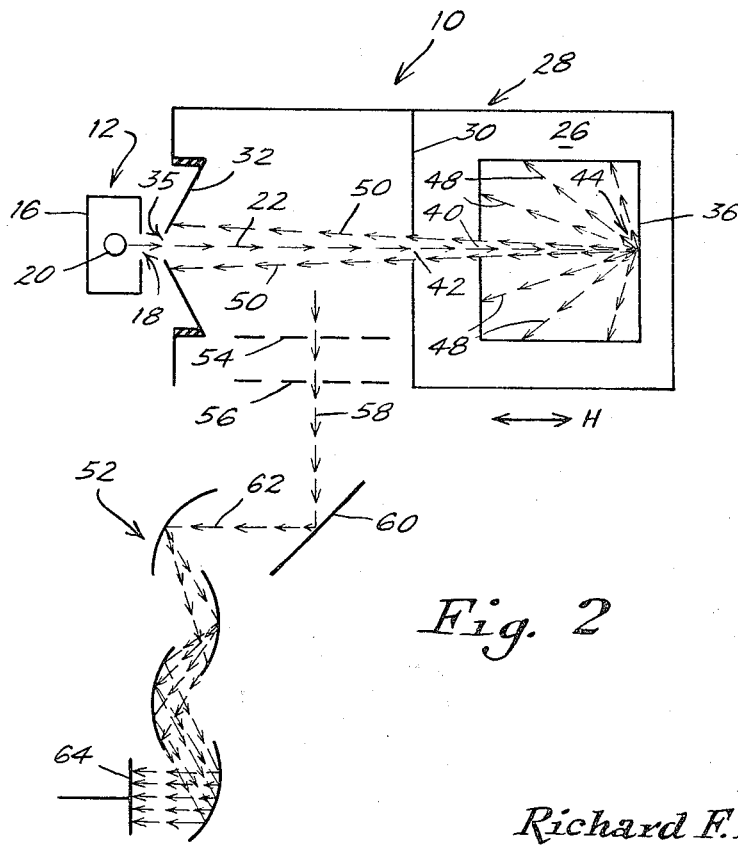

These and further objects and advantages of the invention will become more apparent upon reference to the following description and claims and the appended drawings wherein:

FIGURE 1 illustrates, in vertical cross section, an ultra high vacuum gauge constructed in accordance with one feature of the present invention; and FIGURE 2 illustrates, in vertical cross section, a second type ultra high vacuum gauge constructed in accordance with another feature of the present invention.

The same reference numerals denote the same parts throughout the several views of the drawings.

In reference to FIGURE 1, the ultra high vacuum gauge is shown generally at 10 and consists of an electron source 12 and a detecting section 14. The electron source 12 comprises a box-like housing 16 having an opening 18 therein. Located within this housing is a source of electrons 20 which may be of any type such as, for example, a hot filament or radioactive source which will give off sufficient electrons to ionize the gases within the gauge. The housing 16 may be used to control the electron flow by biasing it negatively with respect to the source 20 by means of voltage from a suitable battery or other D.C. supply 68 to form the electrons passing through the opening 18 into a beam, indicated by the dotted line 22, if desirable.

The detection section 14 of the gauge is divided into two compartments 24 and 26. These compartments are formed by an outer housing 28 and a shielding divider 30. Located at one end of the housing 28 is an anode structure 32 which is constructed in a tapered manner and has located therein an opening 35. Located within the compartment 24 and surrounding the anode 32 is a circular ion collector electrode 34. Located within the compartment 26 is an X-ray trap 36 consisting of a metal box-like structure having an opening 40 therein. This opening 40 is aligned with an opening 42 within the shielding divider 30 so that the electron beam 22 will pass through the openings and strike only against the interior surface of the trap at point 44.

As the electrons travel from the source 20 to the trap 36, some gas molecules located within the compartment 24 will be ionized to produce a cloud of positive ions. As the electron beam strikes the back of the trap 36, at point 44, X-rays will be emitted as indicated by the dotted lines 48. As seen in FIGURE 1, the majority of these X-rays are absorbed by the metal trap 36 with only a small amount of the X-rays escaping from the trap through the opening 40. These escaping X-rays will travel in a path as indicated by the dotted lines 50 and will either strike the shield 30 or anode 32 and thereby be absorbed.

The ion collector 34, which is shown here as a circular element surrounding the electron beam, is located well outside the direct bunch of X-rays 50 at a place where it cannot be reached even by secondary X-ray emissions. The chance of secondary X-ray emissions reaching the collectors is further reduced by the angle placed upon the surface of the anode 32. By slanting the anode, as shown, any secondary emission which may occur is directed back to the partition 30 where it will be aborsobed.

The collector electrode 34 will be biased to a negative potential by an appropriate source 67 so that any positive ions formed in compartment 24 by the electron beam 22 will be attracted to this electrode. By connecting a readout circuit such as, for example, a meter 65 in the collector electrode circuit, an exact reading as to the amount of ion current flowing in the collector circuit may be obtained. This reading will not be affected by the presence of photo electrons since the X-rays which produce these photo electrons have been eliminated.

It is also to be noted that this type of ion gauge requires no critical internal or external electronic or magnetic circuitry either for controlling the voltages on the gauge elements or focussing the electron beam. The electron beam emitted by source 20 may be collimated either by electrostatic electron optical lenses composed, for example, of the opening 18 connected to the voltage supply 68 or a weak longitudinal magnetic field such as indicated by arrow H. The strength of the electron current may be monitored by a suitable meter 66. This type of electron focussing is well known to persons familiar with the art and, for that reason, has not been shown in detail. The source 20, anode 32, and collector 34 are connected to appropriate electronic circuitry.

The operation of the ion gauge of FIGURE 2 is substantially the same as that of FIGURE 1 with the exception that the circular wire collector element 34 of FIGURE 1 has been replaced by an electron multiplier tube 52. This particular arrangement is used when extremely low pressures are to be measured. The operation of the circuit may be explained substantially in the following manner. The positive ions generated by the electronic beam from source 20 are drawn out of the compartment 24 by a set of grids 54 and 56. These ionized particles, indicated by the dotted line 58, strike the plate 60 of the multiplier tube 52. This striking of the plate 60 by positive ions will produce a secondary electron emission, indicated by dotted line 62, which is amplified and multiplied by the tube 52 before being detected by the anode structure 64.

The ion gauge of FIGURE 2 has such a high sensitivity that it will permit counting of a single ion and a substantial reduction of the required electron current. This system will also reduce the pumping speed of the gauge and the errors caused thereby. The only requirement for proper operation of the circuit is that the photo multiplier tube 52 be shielded from the X-rays 50. This has been adequately done in the structure of FIGURE 2 since the X-rays that are not absorbed by the trap 36 will be absorbed by either the anode structure 32 or shield 30 and will not strike the plate of the electron multiplier tube 52.

It will be appreciated from the foregoing that the device of this invention is capable of measuring ion concentration at extremly low pressures due to the absence of any X-rays. The use of the shielding principal will substantially reduce the soft X-rays striking the pick-up element of the ion gauge thereby giving a correct reading which was heretofore unobtainable. The gauge will also exhibit a greater mechanical strength since the gauge elements need not be reduced in size to avoid producing X-rays. This increase in mechanical strength will allow the gauge to be used in circuits where severe vibrations and shock are encountered. The use of the electron multiplier circuit also adds greatly to the use of the ion gauge and allows detection of ion concentrations which would otherwise go undetected.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An ion gauge for measuring gas pressure of the order of $10^{-10}$ torr comprising, a source of electrons for producing ions, focus and control means substantially surrounding said source, anode means adapted to accelerate said electrons, trap means consisting of an enclosure having an opening therein through which said accelerated electrons are received, shielding means located between said anode and said trap, ion collector means located so as to be shielded by said trap and said shield from any X-ray produced by the electrons and means electrically connected to said collector means to measure the flow of ions thereto.

2. An ion gauge for measuring gas pressure of the order of $10^{-10}$ torr comprising, a source of electrons for producing ions, focus and control means substantially surrounding said source, anode means located adjacent said source and adapted to accelerate said electrons, means for forming said accelerated electrons into a beam, X-ray trap means consisting of an enclosure having an opening therein through which said beam enters, shielding means located between said anode and trap, said shielding means having an opening through which said beam passes, ion collector means having an opening through which said beam passes, said collector means being located between said anode and shielding means so as to be completely shielded from any X-rays produced by said electron beam striking said trap means and means electrically connected to said collector means to measure the flow of ions thereto.

3. An ion gauge for measuring gas pressure of the order of $10^{-10}$ torr comprising, a source of electrons for producing ions, focus and control means substantially surrounding said source, anode means located adjacent said source and adapted to accelerate said electrons, means for forming said accelerated electrons into a beam, X-ray trap means consisting of an enclosure having an opening therein through which said beam enters, shielding means located between said anode and trap, said shielding means having an opening through which said beam passes, means for accelerating said ions produced by said beam, collector means for receiving said accelerated ions, said collector means being an electron-multiplier device and means electrically connected to said collector means to measure the flow of ions thereto.

4. An ion gauge for measuring gas pressure of the order of $10^{-10}$ torr comprising, a source of electrons for producing ions, focus and control means substantially surrounding said source, means for forming said electrons into a beam, a substantially cone shaped anode located adjacent said source, said anode having a hole located therein through which said electron beam is accelerated, X-ray trap means consisting of an enclosure having an opening therein thorugh which said beam enters, shielding means located between said anode and trap, said shielding means having an opening through which said beam passes, an ion collector disposed remote from the path of direct and singly reflected X-rays produced by said electron beam, and means electrically connected to said collector to measure the flow of ions thereto.

5. An ion gauge for measuring gas pressure of the of $10^{-10}$ torr comprising, a source of electrons for producing ions, focus and control means substantially surrounding said source, means for forming said electrons into a beam, a substantially cone shaped anode located adjacent said source, said anode having a hole located therein through which said electron beam is accelerated, X-ray trap means consisting of an enclosure having an opening therein through which said beam enters, shielding means located between said anode and trap, said shielding means having an opening through which said beam passes, an electron-multiplier device having a surface on which said ions are collected, means for mounting said electron-multiplier between said anode and shield means but outside the path of direct or singly reflected X-rays or electron beam so as to be completely shielded from any X-rays, grid means located between said electron beam and said electron-multiplier device for accelerating the ions produced by said electron beam toward the surface of said electron-multiplier device and means electrically connected to said electron-multiplier device to measure the flow of ions thereto.

References Cited by the Examiner

UNITED STATES PATENTS 3,109,115   10/1963   Lafferty _____ 313—7

FOREIGN PATENTS 709,266   5/1954   Great Britain.

OTHER REFERENCES

Fox et al. (Photomultipler Ionization Gauge), Review of Scientific Instruments, vol. 32, No. 2, February 1961.

HERMAN KARL SAALBACH, *Primary Examiner.*

ARTHUR GAUSS, *Examiner.*

S. CHATMON, JR. *Assistant Examiner.*